Jan. 11, 1927.
F. C. HAWKINS
1,613,889
COMBINED OIL FILTER AND COOLER
Filed Feb. 10, 1926
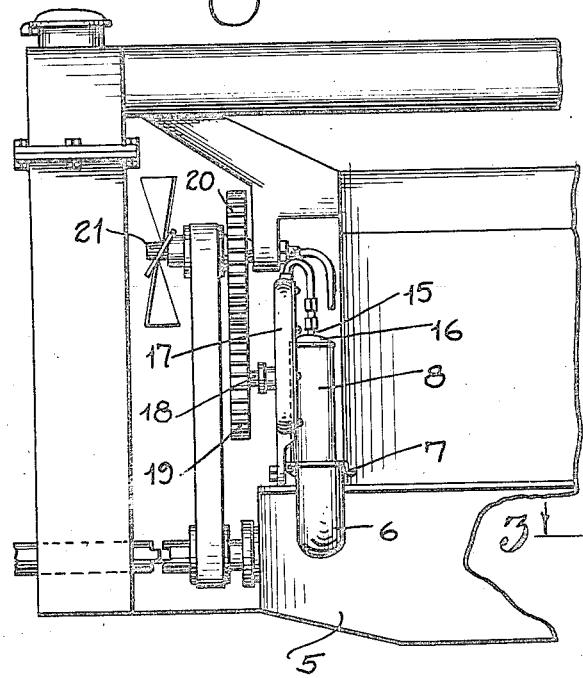
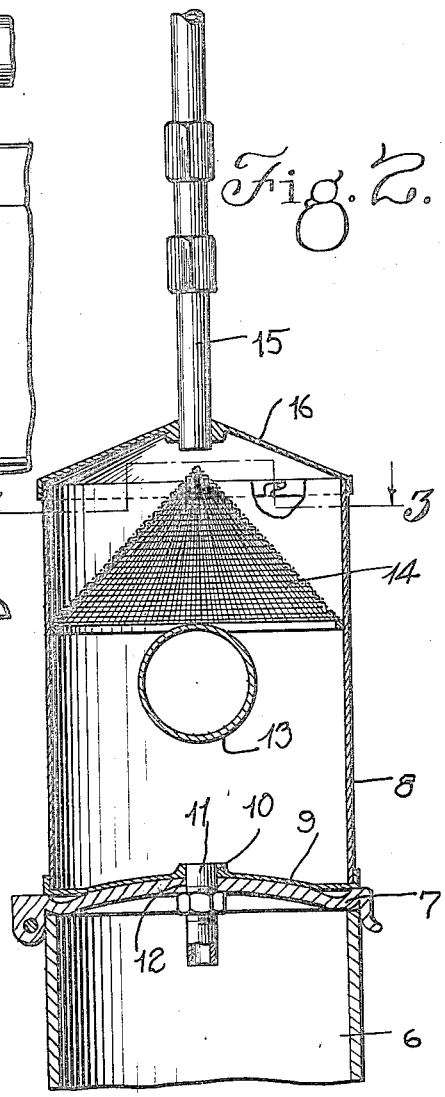
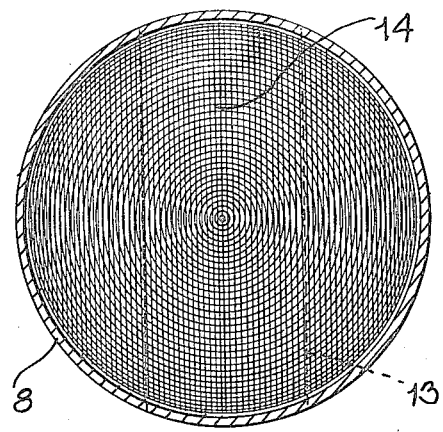
INVENTOR.
Floyd C. Hawkins,
BY
Kuhns Appleman
ATTORNEYS.

Patented Jan. 11, 1927.

1,613,889

UNITED STATES PATENT OFFICE.

FLOYD C. HAWKINS, OF LOS ANGELES, CALIFORNIA.

COMBINED OIL FILTER AND COOLER.

Application filed February 10, 1926. Serial No. 87,341.

This invention relates to oil circulating, filtering and cooling devices, especially for use on automobile engines, the said invention being more particularly for use on the engines of tractors and heavy duty automobiles.

It is an object of this invention to provide novel means for circulating oil by drawing it from the crank case or the circulating pipes of engines, and it is the purpose of the inventor to provide a pump preferably operated from a fan shaft or rotating part of an engine, the said pump being associated with a novel filter and oil cooler prior to its being readmitted to the lubricating system of the engine.

It is a further object of the invention to produce means for filtering and spreading the oil in order that it will issue from the filter in shower-like formation so that oil will cool to better advantage and be subjected to the action of cooling air which will serve to drive heat from the oil as it passes through the cooler and enters the crank case of the automobile.

It is a still further object of this invention to produce a filter which can be readily cleaned and access to the interior of which may be had expeditiously.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of a fragment of an engine showing a device embodying the invention applied thereto;

Figure 2 illustrates a vertical sectional view of the combined filter and cooler and a fragment of the breather pipe of an engine; and Figure 3 illustrates a sectional view of the filter on the line 3—3 of Fig. 2.

In these drawings 5 denotes a crank case, 6 a breather tube which may be of conventional type, and, in the present embodiment of the invention, the breather tube has an apertured cover 7 which constitutes a support for the filter and cooler.

In constructing the combined filter and cooler, a receptacle 8 is employed which is preferably cylindrical and its bottom 9 has an aperture 10 for the reception of a nipple 11 which projects through an aperture 12 in the cover 7 in order that oil being circulated may pass from the receptacle to the crank case through the nipple 11. The wall of the receptacle is provided with a pipe 13 that extends through the receptacle at right angles to its longitudinal axis and this pipe is intended for the circulation of air to aid in cooling oil as it descends from the filtering strainer 14 which is located above the pipe 13.

The strainer 14 is shown as conical with its apex located slightly below the intake or delivery pipe 15 through which oil is admitted to the receptacle. As the oil is discharged from the pipe 15, it is spread over the surface of the strainer prior to its passing through the meshes of the screening, and hence the oil drops past the pipe 13 in spray formation in order that air will act on it to advantage and remove heat from the oil. The filter may be secured in place in the receptacle in any appropriate way so long as it is held near the top of the said receptacle.

The cover 16 of the receptacle is held in place by a bayonet joint of appropriate type in order that it can be readily detached from the receptacle for gaining access to the interior thereof.

The pump 17 is preferably of the gear type located in a case and the pipe 15 may be connected to the interior of the pump case in order that oil will be circulated through it to the receptacle. Any suitable pipe may be employed for connecting the interior of the pump case with the oil supply in the crank case, but, of course, in gear pumps the pipe leading into the case for admitting oil must communicate with the case on the side of the meshing gearing opposite that occupied by the pipe 15.

The drive shaft 18 of the pump has a gear wheel 19 on it that meshes with the gear wheel 20 on the fan shaft 21 and the fan shaft is, of course, driven in appropriate way, either by a belt or other power transmitting means which those skilled in the art will understand.

From an inspection of the drawing and from the foregoing description, it will be apparent that when the fan shaft is driven, the pump will be operated through the gear wheels 20 and 19 and therefore the pump will be operated to circulate oil which when properly connected will draw oil from the lubricating system and force it through the pipe 15 to the filter and cooler, such operation being practically continuous during the operation of the motor.

I claim:

In an internal combustion engine, a crank case having an oil supply, a pump communicating with the crank case below the oil level, means for operating the pump, a combined oil filter and cooler comprising a receptacle having a nipple in its bottom communicating with the crank case, a pipe extending through the receptacle for carrying air through the receptacle, a conical filtering screen having its apex near the top of the receptacle and its base on a plane above the pipe, a pipe leading into the receptacle and discharging therein at the apex of the screen, the said pipe communicating with the pump which circulates the oil.

FLOYD C. HAWKINS.